US009017565B2

(12) United States Patent
Joh et al.

(10) Patent No.: US 9,017,565 B2
(45) Date of Patent: Apr. 28, 2015

(54) INSULATION STRUCTURE OF LNG CARRIER CARGO TANK AND METHOD FOR CONSTRUCTING THE SAME

(75) Inventors: Ki-Hun Joh, Geoje-Si (KR); Sang-Eon Chun, Geoje-Si (KR); Chang-Seon Bang, Geoje-Si (KR); Dai-Gil Lee, Youseong-gu (KR); Byung-Chul Kim, Yeonje-gu (KR); Bu-Gi Kim, Buk-gu (KR); Jin-Gyu Kim, Changwon-si (KR); Soon-Ho Yoon, Nam-gu (KR); Sang-Wook Park, Nam-gu (KR); Kwan-Ho Lee, Guro gu Guro-1 dong (KR); Byoung-Jung Kim, Sunchang-gun (KR); Po-Chul Kim, Cheongdo-gun (KR); Ha-Na Yu, Mungyeong-si (KR)

(73) Assignee: Samsung Heavy Ind. Co., Ltd., Seoul (KR)

(*) Notice: Subject to any disclaimer, the term of this patent is extended or adjusted under 35 U.S.C. 154(b) by 164 days.

(21) Appl. No.: 13/584,431

(22) Filed: Aug. 13, 2012

(65) Prior Publication Data

US 2012/0305524 A1 Dec. 6, 2012

Related U.S. Application Data

(63) Continuation of application No. 12/946,434, filed on Nov. 15, 2010, now abandoned, which is a continuation of application No. PCT/KR2009/003310, filed on Jun. 19, 2009.

(30) Foreign Application Priority Data

Jun. 19, 2008 (KR) ........................ 10-2008-0057795
Jun. 18, 2009 (KR) ........................ 10-2009-0054580

(51) Int. Cl.

| | |
|---|---|
| *B32B 37/12* | (2006.01) |
| *B32B 38/00* | (2006.01) |
| *F17C 1/12* | (2006.01) |
| *B63B 25/16* | (2006.01) |
| *F17C 3/02* | (2006.01) |

(52) U.S. Cl.

CPC ............... *B63B 25/16* (2013.01); *Y10T 156/10* (2015.01); *F17C 3/027* (2013.01); *F17C 2221/033* (2013.01); *F17C 2223/0161* (2013.01);

(Continued)

(58) Field of Classification Search

None

See application file for complete search history.

(56) References Cited

U.S. PATENT DOCUMENTS

| | | | | |
|---|---|---|---|---|
| 3,929,247 A * | 12/1975 | Borup | ...................... | 220/560.15 |
| 4,624,752 A * | 11/1986 | Arrowsmith et al. | ........ | 204/37.6 |
| 6,035,795 A * | 3/2000 | Dhellemmes et al. | ...... | 114/74 A |

FOREIGN PATENT DOCUMENTS

| | | |
|---|---|---|
| CN | 1246590 A | 3/2000 |
| CN | 1273174 A | 11/2000 |

(Continued)

OTHER PUBLICATIONS

Japanese Office Action dated Aug. 14, 2012.

(Continued)

*Primary Examiner* — Anita Alanko

(74) *Attorney, Agent, or Firm* — Brinks Gilson & Lione

(57) ABSTRACT

An insulation structure of a cargo tank in an LNG carrier and a method of constructing the insulation structure include a first metal foil attached and installed in between the top insulation panel and the bottom insulation panel, a second metal foil attached to and installed on the first metal foil that is positioned on an upper side of a gap formed between the bottom insulation panels, and a top bridge panel attached to and installed on an upper side of the second metal foil.

10 Claims, 6 Drawing Sheets

(52) U.S. Cl.
CPC ... *F17C2223/033* (2013.01); *F17C 2270/0107* (2013.01); *F17C 2203/035* (2013.01); *F17C 2203/0358* (2013.01); *F17C 2203/0643* (2013.01); *F17C 2203/0646* (2013.01); *F17C 2203/0663* (2013.01); *F17C 2209/227* (2013.01); *F17C 2260/033* (2013.01); *F17C 2270/0105* (2013.01); *F17C 2270/0168* (2013.01)

(56) References Cited

FOREIGN PATENT DOCUMENTS

| | | | | |
|---|---|---|---|---|
| JP | 2000-079987 A | | 3/2000 |
| JP | 2008-014487 A | | 1/2008 |
| JP | 2008-531941 A | | 8/2008 |
| KR | 10-2005-0015840 | | 2/2005 |
| KR | 10-2005-0557354 A | * | 2/2005 |
| KR | 10-0557354 B1 | | 3/2006 |
| KR | 10-0751697 B1 | | 8/2007 |
| WO | WO 2007052961 A1 | * | 5/2007 |

OTHER PUBLICATIONS

Office Action of related Chinese Application No. 200980117789.6, dated Feb. 4, 2013, pp. 4-7.

Office Action—State Intellectual Property Office (SIPO) (China), dated Jul. 3, 2012, with English Summarization.

* cited by examiner

INSULATION STRUCTURE OF LNG CARRIER CARGO TANK AND METHOD FOR CONSTRUCTING THE SAME

RELATED APPLICATIONS

This application is a divisional of U.S. patent application Ser. No. 12/946,434, now abandoned which is a continuation and claims the benefit of priority under 35 U.S.C. §§120, 365, and 371 to Patent Cooperation Treaty Patent Application No. PCT/KR2009/003310, filed on Jun. 19, 2009, which claims the benefit of priority to Korean Application Nos. 10-2008-0057795, filed Jun. 19, 2008, and 10-2009-0054580, filed Jun. 18, 2009. The disclosures of the above applications are incorporated herein by reference in their entireties.

TECHNICAL FIELD

The present invention is related to an insulation structure of an LNG carrier cargo tank and a method for constructing the insulation structure of an LNG carrier cargo tank, more specifically to an insulation structure of an LNG carrier cargo tank and a method for constructing the insulation structure of an LNG carrier cargo tank that can improve the sealing integrity of a gap formed between insulation panels of the cargo.

BACKGROUND

LNG (liquefied natural gas) generally refers to colorless, transparent cryogenic liquid converted from natural gas (predominantly methane) that is cooled to approximately −163° C. and condensed to $1/600^{th}$ the volume.

As LNG emerges as an energy source, efficient transportation means have been sought in order to transport LNG from a supply site to a demand site in a large scale so as to utilize LNG as energy. Resulted in a part of this effort is LNG carriers, which can transport a large quantity of LNG by sea.

LNG carriers need to be furnished with a cargo tank that can keep and store cryogenically liquefied LNG, but such carriers require intricate and difficult conditions. That is, since LNG has vapor pressure that is higher than atmospheric pressure and boiling point of approximately −163° C., the cargo tank that stores LNG needs to be constructed with materials that can withstand very low temperature, for example, aluminum steel, stainless steel and 33% nickel steel, and designed in a unique insulation structure that can withstand thermal stress and thermal contraction and can be protected from heat leakage, in order to keep and store LNG safely.

Here, the structure of a cargo tank insulation of an LNG carrier is described below. FIG. 1 is a sectional view illustrating the conventional cargo tank structure of an LNG carrier. As illustrated in FIG. 1, a bottom insulation panel 10 is adhered and fixed by way of a fixing plate 10*a* to an internal face of a hull 1 of an LNG carrier by epoxy mastic 13 and a stud bolt 14. Arranged above the bottom insulation panel 10 is a top insulation panel 20, and a rigid triplex 22 is interposed between the bottom insulation panel 10 and the top insulation panel 20.

The rigid triplex 22, which is an insulation panel to which the bottom insulation panel 10 and the top insulation panel 20 are attached, is pre-manufactured in a shop and supplied into the cargo tank to constitute a secondary barrier of the cargo tank.

When the insulation panel, such as the bottom insulation panel 10 and the top insulation panel 20, is adhered to a cargo tank wall, a gap 40 is formed between the adjacent bottom insulation panels 10 so that a flat joint 18 made of a glass wool material can be inserted in the gap 40.

Then, a top bridge panel 28 is attached in between the top insulation panels 20 by adhering a supple triplex 26 over the rigid triplex 22, which is already attached, with epoxy glue 24 and then adhering the top bridge panel 28 over the supple triplex 26 with epoxy glue 24.

The top insulation panel 20 and an upper part of the top bridge panel 28 have a same planar surface, on which a corrugated membrane 30, in which a plurality of corrugations are formed, is attached as a primary barrier to complete the insulation structure of the cargo tank of an LNG carrier.

Although a continuity-guaranteed sealed barrier has been conventionally provided through the supple triplex 26 over the gap 40 between the bottom insulation panels 10, there has been a problem of a possible drop in sealing effect if an adhesive impregnated in the triplex has a high viscosity. Moreover, in case thermal load is repeatedly exerted on the composite material of the triplex, a crack can occur due to a difference in the coefficient of thermal expansion between internal reinforced fiber and resin, thereby possibly causing a gas leak.

SUMMARY

To address the above problems, an aspect of the present invention provides an insulation structure of a cargo tank of an LNG carrier having a secondary barrier of a top insulation panel and bottom insulation panels, which can include: a first metal foil attached and installed in between the top insulation panel and the bottom insulation panels; a second metal foil attached to and installed on the first metal foil that is positioned on an upper side of a gap formed between the bottom insulation panels; and a top bridge panel attached to and installed on an upper side of the second metal foil.

Here, the first metal foil and the second metal foil can be made of aluminum or stainless steel and can be coated with a primer or silane.

Protective films can be installed on adhesion parts formed on the first metal foil and the second metal foil to prevent a foreign substance from being attached.

Alternatively, adhesive members can be pre-coated on the adhesion parts formed on the first metal foil and the second metal foil, and the insulation structure can also include protective films installed on the adhesive members and preventing a foreign substance from being attached.

Each of the adhesive members can include filler particles, can be an adhesive film in which an adhesive is coated on a surface of a synthetic resin film, or can be a prepreg.

The second metal foil can have a flat shape or a shape with an arc-shaped protruded groove in a middle area, in which the groove is protruded downward along a lengthwise direction of the gap.

Another aspect of the present invention provides a method of constructing the insulation structure of a cargo tank of an LNG carrier, which can include: attaching an adhesive film to a lower face of a second metal foil; receiving the second metal foil at an adhesion location where the gap is covered in such a way that two opposite sides of the lower face of the second metal foil are respectively in contact with an adjacent pair of first metal foils; installing an adhesive jig on an upper face of the second metal foil; and attaching the second metal foil to the first metal foils by heating and pressing the second metal foil with the adhesive jig.

The method can also include, prior to the attaching of the adhesive film, surface-treating a surface of the second metal foil. The surface-treating can be sand blasting or etching. The method can also include, between the surface-treating of the surface of the second metal foil and the attaching of the adhesive film, coating a primer or silane on the surface of the second metal foil.

The adhesive jig can include: pressing member configured to press the second metal foil downward; and a heating pad installed in a lower part of the pressing member. The pressing member can include an air bag, and the heating pad can include a plane heater.

The width by which the first metal foils and the second metal foil make contact can be between 70 mm and 90 mm. The second metal foil can be pressed to between 50 mbar and 350 mbar and heated to between 110° C. and 140° C. for 1 hour and 30 minutes to 2 hours by the adhesive jig. The second metal foil can be pressed to 300±1 mbar and heated to 130±1° C. by the adhesive jig. The width and length of the heating pad can be greater than those of the second metal foil by 100 mm and 400 mm or more, respectively.

DETAILED DESCRIPTION

Hereinafter, certain embodiments of the present invention will be described with reference to the accompanying drawings.

Figure 1:
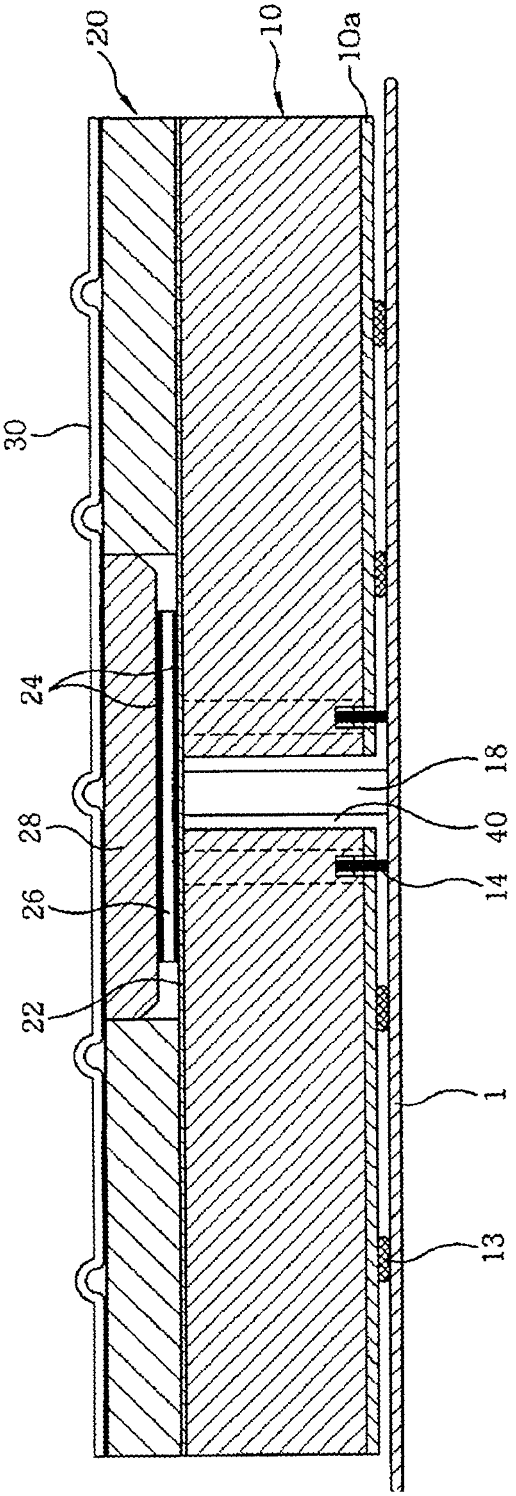
FIG. 1 PRIOR ART
FIG. 1 is a sectional view illustrating a conventional cargo tank structure of an LNG carrier.
Figure 2:
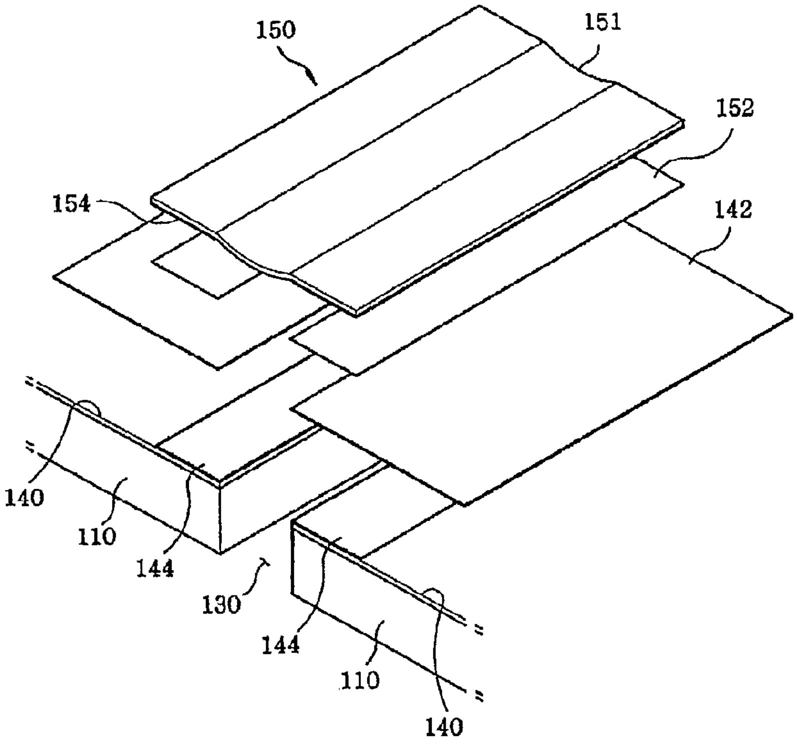
FIG. 2 is an exploded perspective view of an insulation structure of a cargo tank in an LNG carrier in accordance with an embodiment of the present invention.
Figure 3:
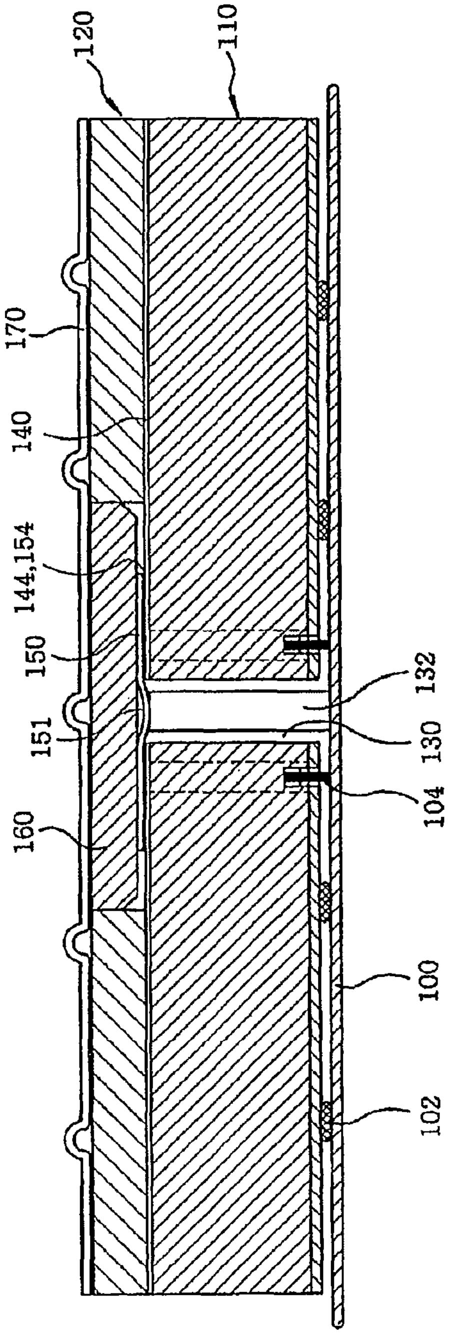
FIG. 3 is a sectional view of an insulation structure of a cargo tank in an LNG carrier in an LNG carrier in accordance with an embodiment of the present invention.

FIG. 2 is an exploded perspective view of an insulation structure of a cargo tank in an LNG carrier in accordance with an embodiment of the present invention, and FIG. 3 is a sectional view of an insulation structure of a cargo tank in an LNG carrier in an LNG carrier in accordance with an embodiment of the present invention.

In the structure of a cargo tank for cryogenic liquid in an LNG carrier illustrated in FIGS. 2 and 3, a bottom insulation panel 110 is adhered and fixed to an internal face of a hull 100 of the LNG carrier by an epoxy mastic 102 and a stud bolt 104, and a top insulation panel 120 is installed over the bottom insulation panel 110 to constitute a part of a secondary barrier.

Here, a first metal foil 140 is adhered and installed in between the bottom insulation panel 110 and the top insulation panel 120.

The first metal foil 140 is made of flat and thin aluminum or stainless steel, and the first metal foil 140 is adhered and installed by an adhesive, such as epoxy glue, in the same area as that of the bottom insulation panel 110.

Moreover, for enhanced adhesive strength, the first metal foil 140 is coated with a primer or silane.

In addition, a protective film for preventing a foreign substance from being attached can be installed on an adhesion part of the first metal foil 140 over the bottom insulation panel 110 that is exposed to an upper side of a gap 130, which will be described later. Alternatively, it is possible that an adhesive member 144 is pre-coated on the adhesion part of the first metal foil 140 and then a protective film 142 for preventing a foreign substance from being attached is installed on the adhesive member 144.

The adhesive member 144 can include filler particles, and specific examples of the filler particles include electrically-insulating inorganic particles, such as natural silica, synthetic silica, alumina, titanium oxide and glass, and organic particles, such as polytetrafluoroethylene, crosslinked acryl, benzoguanamine, crosslinked polyurethane, crosslinked styrene and melamine.

Used for the adhesive member 144 can be an adhesive film, on which an adhesive is coated on the surface of a synthetic resin film, or a prepreg, which is fiber-reinforced composite. Here, the above-described filler particles can be included in the adhesive.

The insulation panel is pre-manufactured in a shop by attaching the bottom insulation panel 110 to the top insulation panel 120 with the first metal foil 140 in between.

The insulation panel is adhered to a cargo tank wall with a space for inserting a flat joint 132 of a glass wool material in between the gaps 130. For sealing continuity, a second metal foil 150 is adhered to the first metal foil 140 on the bottom insulation panel 110 that is exposed to the upper side of the gap 130.

The second metal foil 150 is made of a plate-shaped metallic material, such as aluminum or stainless steel, and can be made to have a flat shape. Alternatively, as illustrated, a middle section of the second metal foil 150 can be formed with an arc-shaped protruded groove 151, which is protruded toward the bottom along the lengthwise direction of the gap 130, to cope with thermal contraction. The metal foil 150 is installed in such a way that the protruded groove 151 faces the flat joint 132.

The second metal foil 150 can be coated with a primer or silane for improved adhesive strength, and a protective film 152 for preventing a foreign substance from being attached can be installed on an adhesion part formed on a surface of the second metal foil 150. Alternatively, an adhesive member 154 can be pre-coated on the adhesion part of the second metal foil 152, and then the protective film for preventing a foreign substance from being attached can be installed on the adhesive member 154.

Filler particles can be included in the adhesive member 154. Used for the adhesive member 154 can be an adhesive film, on which an adhesive is coated on the surface of a synthetic resin film, or a prepreg, which is fiber-reinforced composite.

Then, a top bridge panel 160 is attached over the second metal foil 150 by use of, for example, epoxy glue.

An upper part of the top insulation panel 120 and an upper part of the top bridge panel 160 have a same planar surface, on which a corrugated membrane 170 is attached as a primary barrier to complete the insulation structure of the cargo tank.

The insulation structure of an LNG carrier cargo tank having the above structure functions as follows.

Referring back to FIG. 3, a plurality of stud bolts 104 are installed on an internal face of the hull 100 by use of resistance welding or a separate stud gun.

Then, a second barrier panel, which is constituted by the bottom insulation panel 110 and the top insulation panel 120, are fixed to the hull 100.

Here, the flat joint 132 is inserted and installed in the gap 130 between the bottom insulation panel 110 and another bottom insulation panel 110.

Then, the protective film 142 is removed from the first metal foil 140 that is on the bottom insulation panel 110 exposed to the top side of the gap 130, and the second metal foil 150 is attached using the adhesive of the coated adhesive member 144 or the adhesive film.

Here, the protective film 152 is also removed from the adhesion part of the second metal foil 150, and the second metal foil 150 is adhered with the adhesive member 144 of the first metal foil 140 by using the adhesive 154 of the coated adhesive member 154 or the adhesive film. Here, the protruded groove 151 of the second metal foil 150 is installed to face the flat joint 132 of the gap 130, thereby absorbing the thermal deformation of expansion and contraction to prevent a drop in sealing integrity.

Then, epoxy glue is coated on an upper side of the second metal foil 150, and the top bridge panel 160 is attached. Then, the corrugated membrane 160, in which a plurality of corrugations are formed, is attached as the primary barrier over the top insulation panel 120 and the top bridge panel 150 by way of an anchor strip (not shown), to complete the insulation structure of the cargo tank.

Hitherto, the insulation structure of a flat area of the cargo tank has been described, but the insulation structure of corner areas of the cargo tank, which are not illustrated, needs to be constructed more rigidly that that of the flat area. It is also possible to apply the insulation structure of the cargo tank in the LNG carrier in accordance with an embodiment of the present invention, which uses the first metal foil 140 and the second metal foil 150, in the corner areas of the cargo tank.

Therefore, the present invention can prevent thermal deformation and improve sealing integrity by interposing the first metal foil 140 made of a metallic material between the bottom insulation panel 110 and the top insulation panel 120 instead of a triplex made of a composite material, which can cause a crack and result in a gas leak due to the difference in coefficient of thermal expansion between internal reinforced fiber and resin, and by installing the second metal foil 150 on the first metal foil 140 that is on the upper side of the gap 130.

Figure 4:
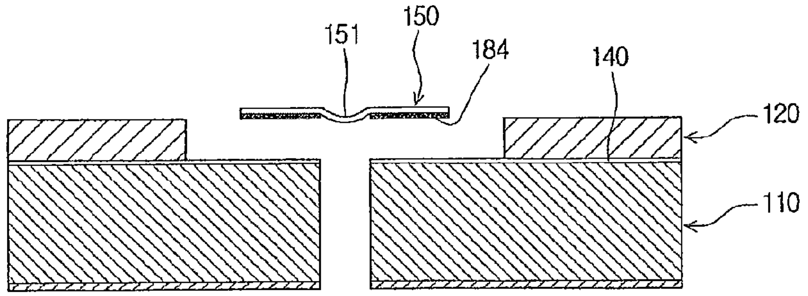
FIGS. 4 and 5 are sectional views illustrating a method of constructing an insulation structure of a cargo tank in an LNG carrier in accordance with an embodiment of the present invention.
Figure 5:
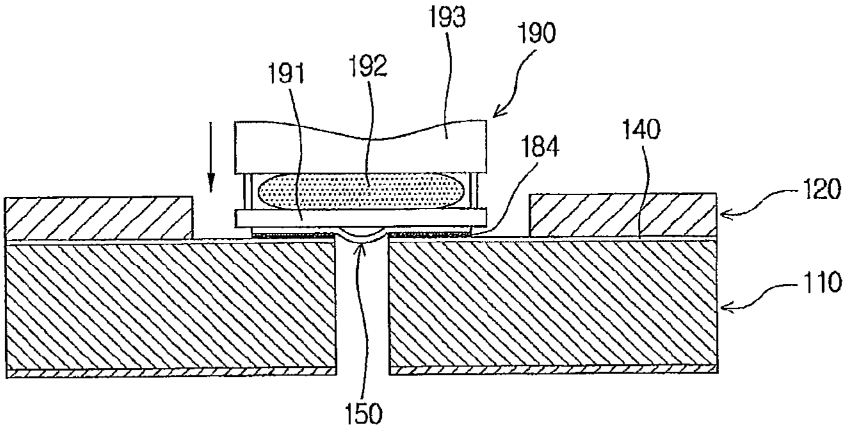
Figure 6:
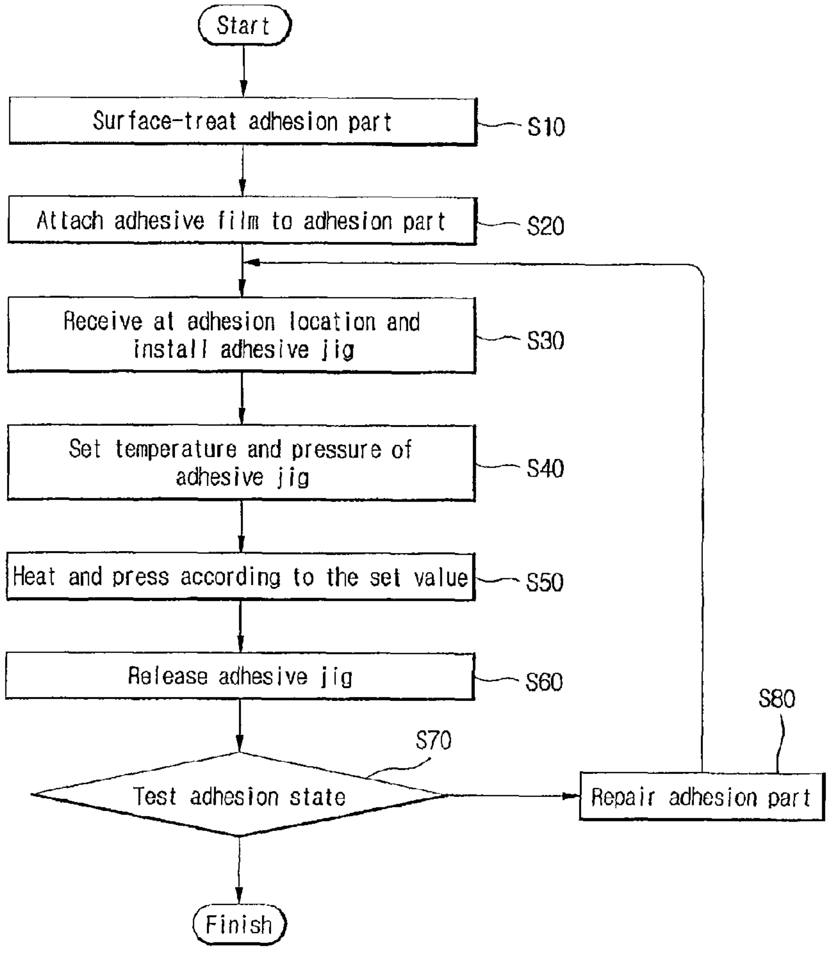
FIG. 6 is a flow diagram of a method of constructing an insulation structure of a cargo tank in an LNG carrier in accordance with an embodiment of the present invention.

FIGS. 4 and 5 are sectional views illustrating a method of constructing an insulation structure of a cargo tank in an LNG carrier in accordance with an embodiment of the present invention, and FIG. 6 is a flow diagram of a method of constructing an insulation structure of a cargo tank in an LNG carrier in accordance with an embodiment of the present invention. The method of constructing an insulation structure of a cargo tank in an LNG carrier in accordance with an embodiment of the present invention will be described with reference to FIGS. 4 to 6.

Referring to FIGS. 4 to 6, an adhesive film 184 is adhered to a lower face of the second metal foil 150 (S20). As described above, a film of a synthetic material that is coated with an adhesive can be used as the adhesive film 184.

Prior to attaching the adhesive film 184 on the lower face of the second metal foil 150, foreign substances or corrosion can be removed from the lower face of the second metal foil 150, and the second metal foil 150 can be surface-treated, for better adhesion (S10). The surface treatment can be performed by, for example, sand blasting or etching.

After the lower face of the second metal foil 150 is surface-treated (S10), and before the adhesive film 184 is attached (S20), the lower face of the second metal foil 150 can be coated with a primer or silane for better adhesion.

The second metal foil 150, to which the adhesive film is attached, is received at an adhesion location, and then an adhesive jig 190 is installed over the second metal foil 150 (S30).

The adhesion location of the second metal foil 150 is where the gap 130 (shown in FIG. 3) formed in between a pair of the adjacent bottom insulation panels 110 is covered in such a way that two sides of the lower face of the second metal foil 150 are in contact with a pair of the adjacent first metal foils 140.

The adhesive jig 190 includes a pressing member 193, which can press down the second metal foil 150, and a heating pad 191, which is installed in a lower part of the pressing member 193. Here, an air bag 192 can be included in the pressing member 193. The heating pad 191 can have a lower end part that is flat, and can be built in with a heating coil or a plane heater such as a ceramic heater, which is not illustrated.

After the adhesive jig 190 is installed on an upper face of the second metal foil 150, the temperature and pressure to be applied to the second metal foil 150 is set in such a way that the temperature and pressure are appropriate for the properties of the adhesive film 184 (S40). Then, the second metal foil 150 is heated and pressed by the adhesive jig 190 in accordance with the set value (S50).

The width and length of the heating pad 191 are formed to be greater than those of the second metal foil 150 in order to have the second metal foil 150 heated and pressed uniformly. When the heating pad 191 is installed on the upper face of the second metal foil 150, edges of the heating pad 191 are made to protrude out of the second metal foil 150.

According to an experiment, the second metal foil 150 was uniformly heated and pressed when the edges of the heating pad 191 were protruded by 50 mm in both of its widthwise directions and by 200 mm in both of its lengthwise directions. Therefore, it is preferable that the width and length of the heating pad 191 are greater than those of the second metal foil 150 by 100 mm and 400 mm or more, respectively.

Here, if the air bag 192 is used with the pressing member 193, uniform pressure can be exerted on the heating pad 191, and thus any deviation in the pressure exerted on the second metal foil 150 can be prevented. As a result, the heat and pressure exerted on the second metal foil 150 become uniform, and the adhesive film 184 can be uniformly attached.

According to an experiment, a good adhesion effect by the adhesive film 184 was observed when the second metal foil 150 was heated to between 110° C. and 140° C. and pressed to between 50 mbar and 350 mbar for 1 hour and 30 minutes to 2 hours by the adhesive jig 190. Particularly, a maximum adhesion effect was observed when the heating temperature was 130±1° C. and the pressure was 300±1 mbar.

After the second metal foil 150 has been heated and pressed for a certain period of time, the adhesive jig 190 is released (S60). That is, the adhesive jig 190 is separated from the second metal foil 150. A test is performed to check whether the first metal foil 140 and the adhesion part of the second metal foil 150 are sufficiently tightly sealed (S70).

If the test result shows that the first metal foil 140 and the second metal foil 150 are poorly adhered, the adhesion part is repaired. That is, a new adhesive film 184 is adhered to the second metal foil 150, and then the second metal foil 150 is received again at the adhesion location.

If the test result shows that the first metal foil 140 and the second metal foil 150 are properly adhered to have sufficient sealing integrity, the top bridge panel 160 (shown in FIG. 3), the corrugated membrane 170 (shown in FIG. 3), etc. are installed over the second metal foil 150 to complete the construction of the insulation structure.

For reference, sufficient sealing integrity was observed when the width by which the first metal foil and the second metal foil made contact was between 70 mm and 90 mm.

Although the adhesive member 144, 154 (shown in FIG. 3) described above can be used instead of the adhesive film 184, the adhesion part between the first metal foil 140 and the second metal foil 150 can be formed with a uniform thickness by using the adhesive film 184, making the sealing integrity uniform in the adhesion part.

Moreover, since the adhesive film 184 can be pre-attached to the second metal foil 150 when the adhesive film 184 is supplied to a construction site, it is possible to speed up the construction.

Although an insulation structure of a cargo tank in an LNG carrier and a method of constructing the insulation structure in accordance with an embodiment of the present invention have been described hitherto, it shall be apparent that the present invention is not restricted by the presented embodiment and can be readily presented in another embodiment by a person skilled in the art to which the present invention pertains by supplementing, modifying, deleting and/or adding any of the elements within the same technical ideas. However, such modified or permutated embodiment shall be also included in the appended claims.

What is claimed is:

1. A method of constructing an insulation structure of a cargo tank of an LNG carrier constituted by a secondary barrier of top and bottom insulation panels, comprising a first metal foil attached and installed in between the top insulation panel and the bottom insulation panel; a second metal foil attached to and installed on the first metal foil that is positioned on an upper side of a gap formed between the bottom insulation panels; and a top bridge panel attached to and installed on an upper side of the second metal foil; wherein the first metal foil and the second metal foil are made of aluminum or stainless steel and are coated with a primer or silane, an adhesive member is disposed on the adhesion part formed on the first metal foil and the second metal foil, the method comprising:

providing an assembly including the second metal foil, the adhesive member, and a protective film, wherein the assembly is formed by surface-treating a surface of the second metal foil, coating a primer or silane on the surface of the second metal foil, attaching the adhesive member to a lower face of the second metal foil, and attaching a protective film to the second metal foil to cover the adhesive member on the second metal foil to prevent a foreign substance from being attached;

removing the protective film to expose the adhesive member on the second metal foil;

placing the second metal foil at an adhesion location above the gap such that two opposite sides of the lower face of the second metal foil are respectively in contact with a pair of the adjacent first metal foil;

installing an adhesive jig on an upper face of the second metal foil; and attaching the second metal foil to the first metal foil by heating and pressing the second metal foil with the adhesive jig.

2. The method of claim 1, wherein the surface-treating is sand blasting or etching.

3. The method of claim 1, wherein the adhesive jig comprises:

pressing means configured to press the second metal foil downward; and a heating pad installed in a lower part of the pressing means.

4. The method of claim 3, wherein the pressing means includes an air bag.

5. The method of claim 3, wherein the heating pad comprises a plane heater.

6. The method of claim 1, wherein a width by which the first metal foil and the second metal foil make contact is between 70 mm and 90 mm.

7. The method of claim 1, wherein the second metal foil is pressed to between 50mbar and 350mbar and heated to between 110° C. and 140° C. for 1 hour and 30 minutes to 2 hours by the adhesive jig.

8. The method of claim 7, wherein the second metal foil is pressed to 300±1 mbar and heated to 130±1° C. by the adhesive jig.

9. The method of claim 5, wherein a width and a length of the heating pad are respectively greater than those of the second metal foil.

10. The method of claim 9, wherein the width and the length of the heating pad are greater than those of the second metal foil by 100 mm and 400 mm or more, respectively.

* * * * *